(12) United States Patent
Kunitake et al.

(10) Patent No.: US 7,723,430 B2
(45) Date of Patent: May 25, 2010

(54) THIN FILM HAVING INTERPENETRATING NETWORK LAYER AND METHOD FOR MANUFACTURING THE THIN FILM

(75) Inventors: Toyoki Kunitake, Wako (JP); Richard Vendamme, Wako (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 12/086,499

(22) PCT Filed: Dec. 13, 2006

(86) PCT No.: PCT/JP2006/324853

§ 371 (c)(1),
(2), (4) Date: Nov. 14, 2008

(87) PCT Pub. No.: WO2007/069649

PCT Pub. Date: Jun. 21, 2007

(65) Prior Publication Data

US 2009/0098353 A1    Apr. 16, 2009

(30) Foreign Application Priority Data

Dec. 15, 2005    (JP) .............................. 2005-361656

(51) Int. Cl.
*C08K 3/38* (2006.01)

(52) U.S. Cl. ...................... 524/779; 524/780; 524/783; 524/784; 524/785; 524/786

(58) Field of Classification Search ................. 524/779, 524/780, 783, 784, 785, 786
See application file for complete search history.

(56) References Cited

U.S. PATENT DOCUMENTS

| | | | |
|---|---|---|---|
| 6,472,073 B1 * | 10/2002 | Singh et al. .................. 428/432 |
| 2002/0190251 A1 | 12/2002 | Kunitake et al. |
| 2004/0247791 A1 * | 12/2004 | Hu et al. .................. 427/372.2 |
| 2007/0212514 A1 * | 9/2007 | Huang et al. .................. 428/98 |
| 2008/0022896 A1 * | 1/2008 | Karkkainen .................. 106/285 |

FOREIGN PATENT DOCUMENTS

| | | | |
|---|---|---|---|
| JP | 405005041 | * | 1/1993 |
| JP | 10-249985 A | | 9/1998 |
| JP | 2001342018 | * | 12/2001 |
| JP | 2002-275284 A | | 9/2002 |
| JP | 2002-338211 A | | 11/2002 |

* cited by examiner

*Primary Examiner*—Bernard Lipman
(74) *Attorney, Agent, or Firm*—Birch, Stewart, Kolasch & Birch, LLP

(57) ABSTRACT

Provided is a thin film having self-supporting properties and having excellent strength, durability and flexibility and a method for manufacturing the thin film. A thin film having an interpenetrating net-work layer and having a film thickness of 500 nm or less, the interpenetrating net-work layer being constituted of at least a metal oxide and an organic polymer.

4 Claims, 8 Drawing Sheets

[Fig. 1]
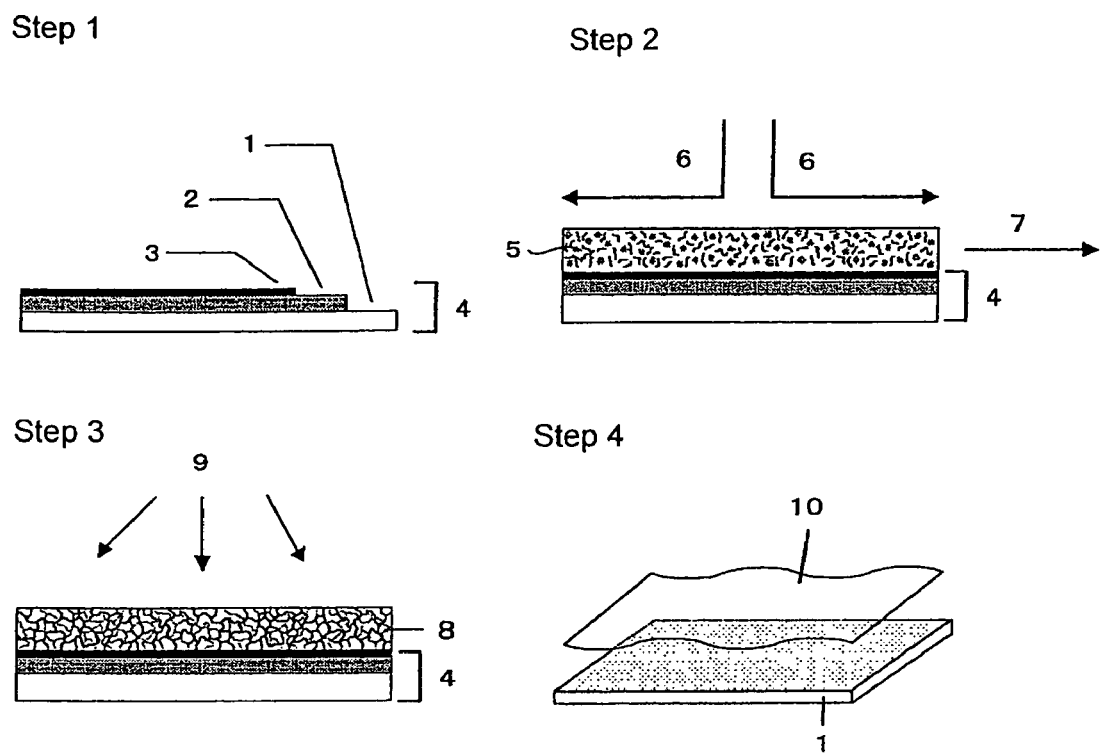

[Fig. 2]
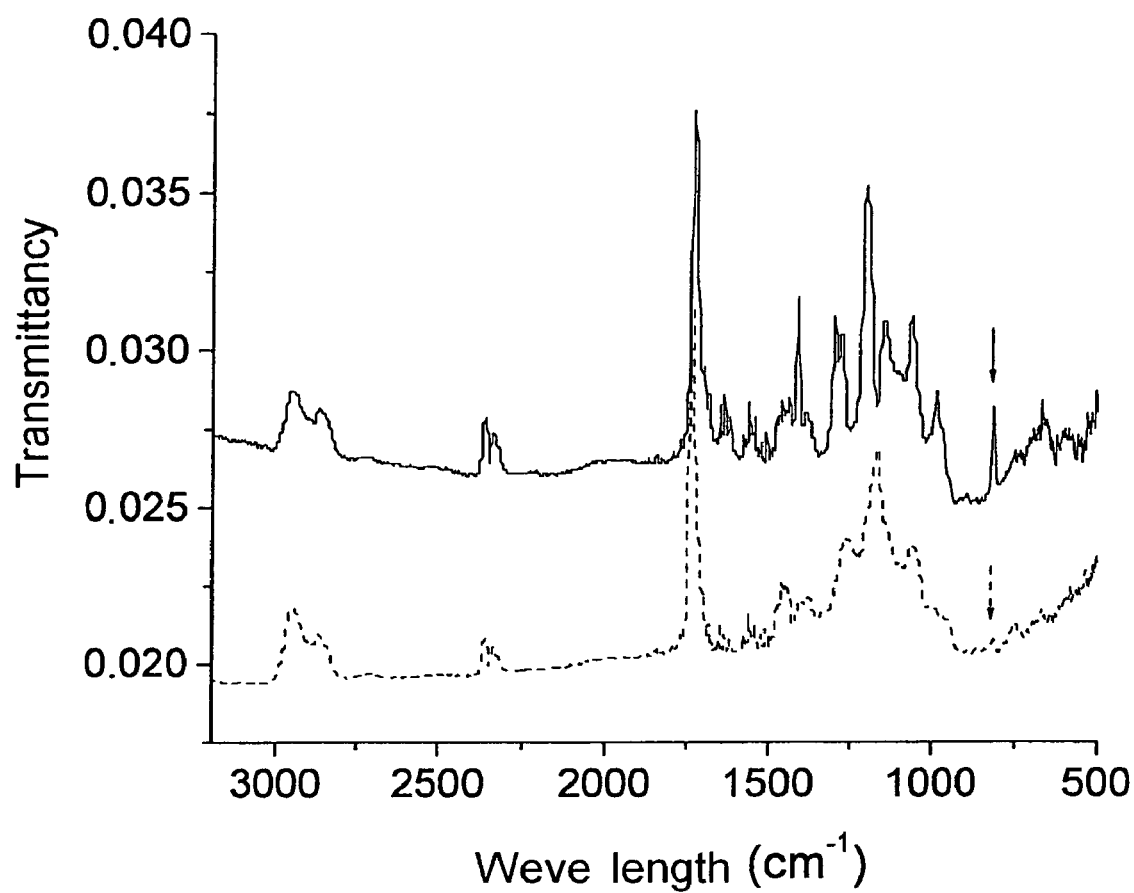

[Fig. 3]
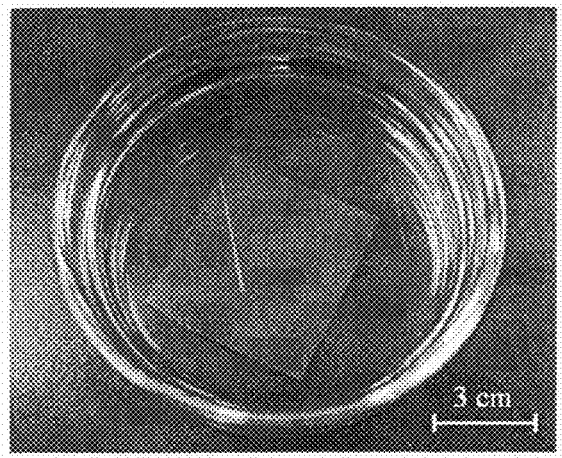
[Fig. 4]
(a)
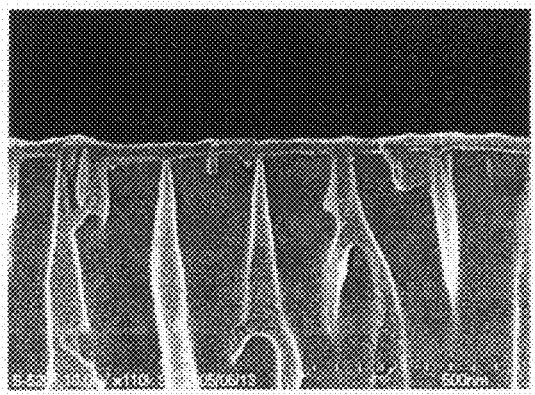
(b)
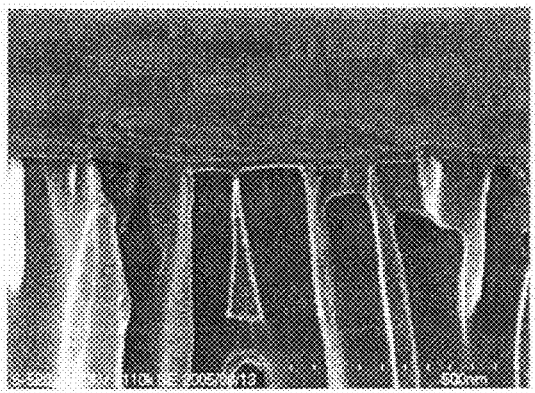
(c)
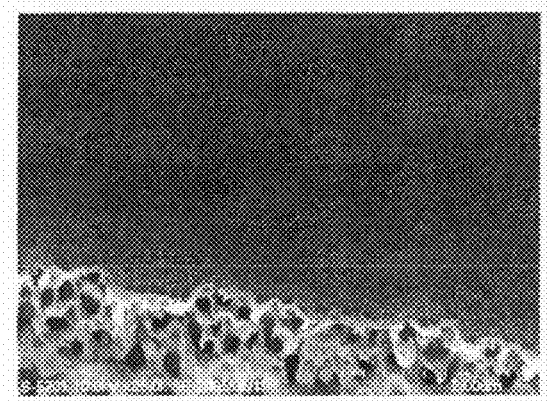
(d)
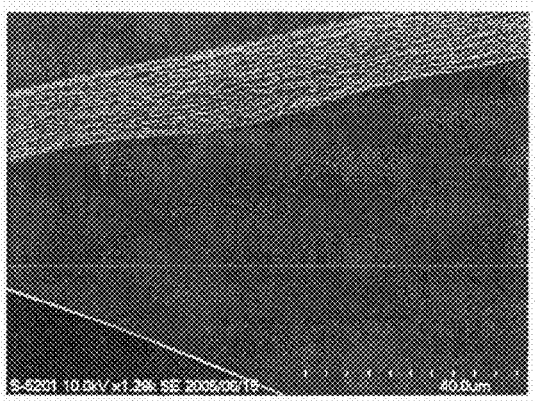

[Fig. 5]
(a) (b)
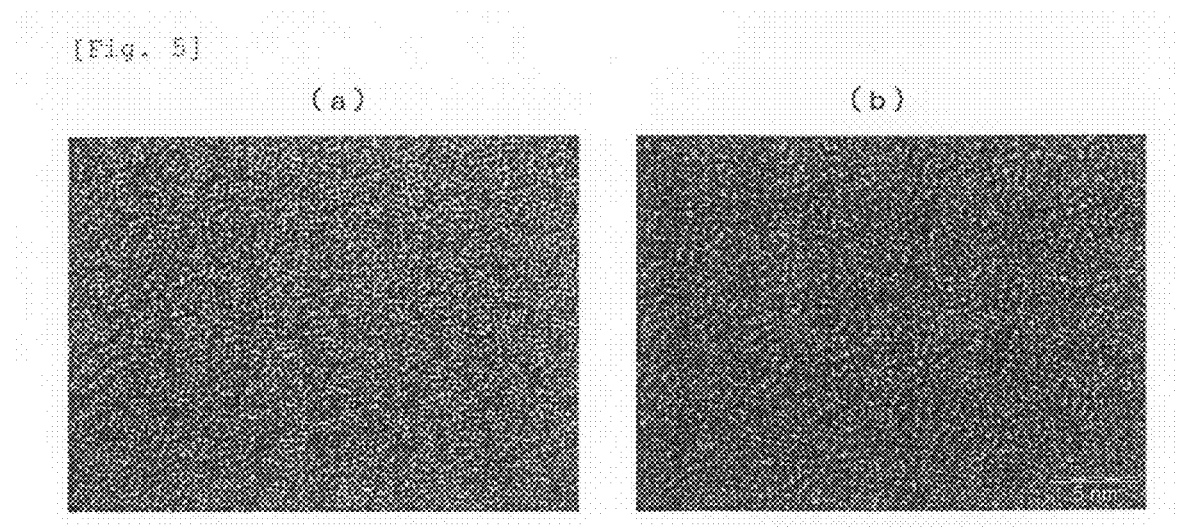
[Fig. 6]
(a) (b)
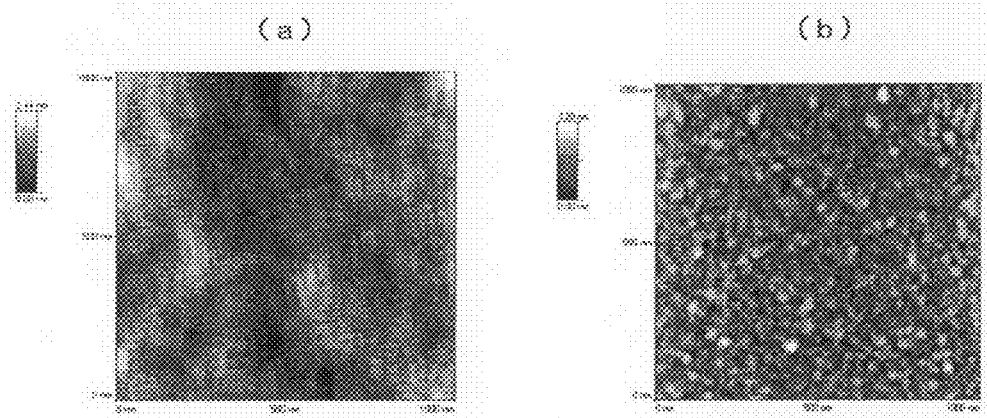

[Fig. 7]
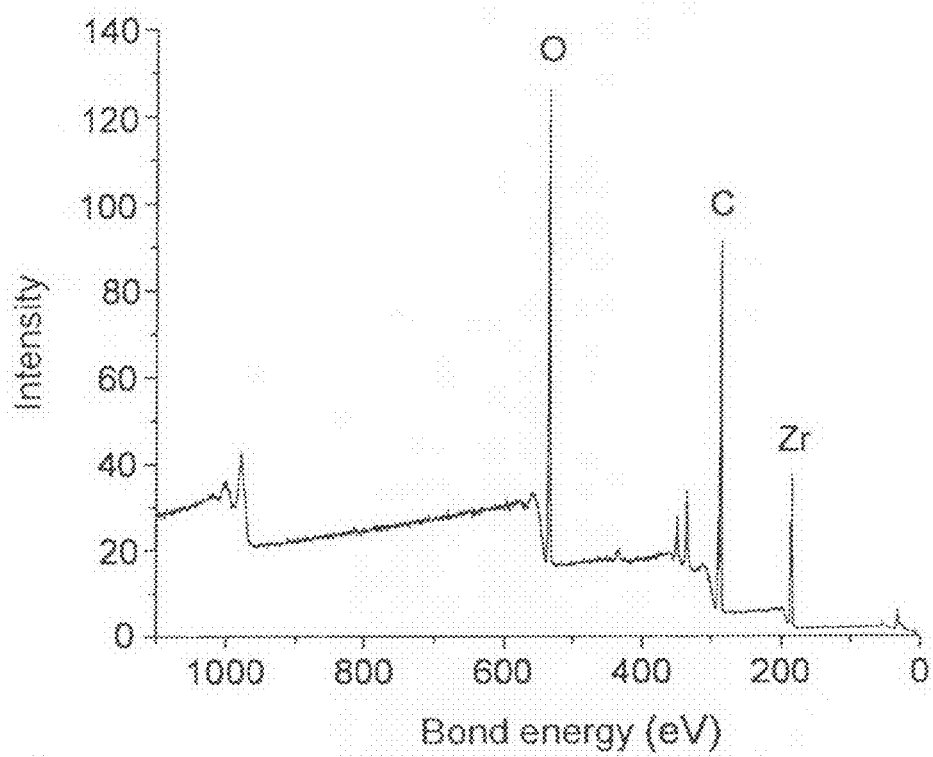
[Fig. 8]
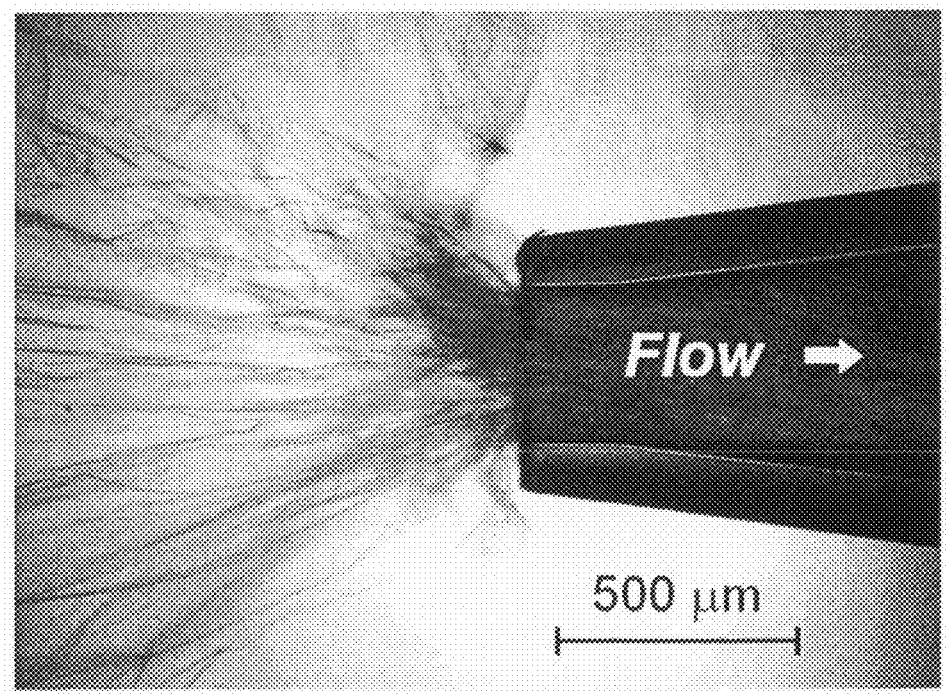

[Fig. 9]

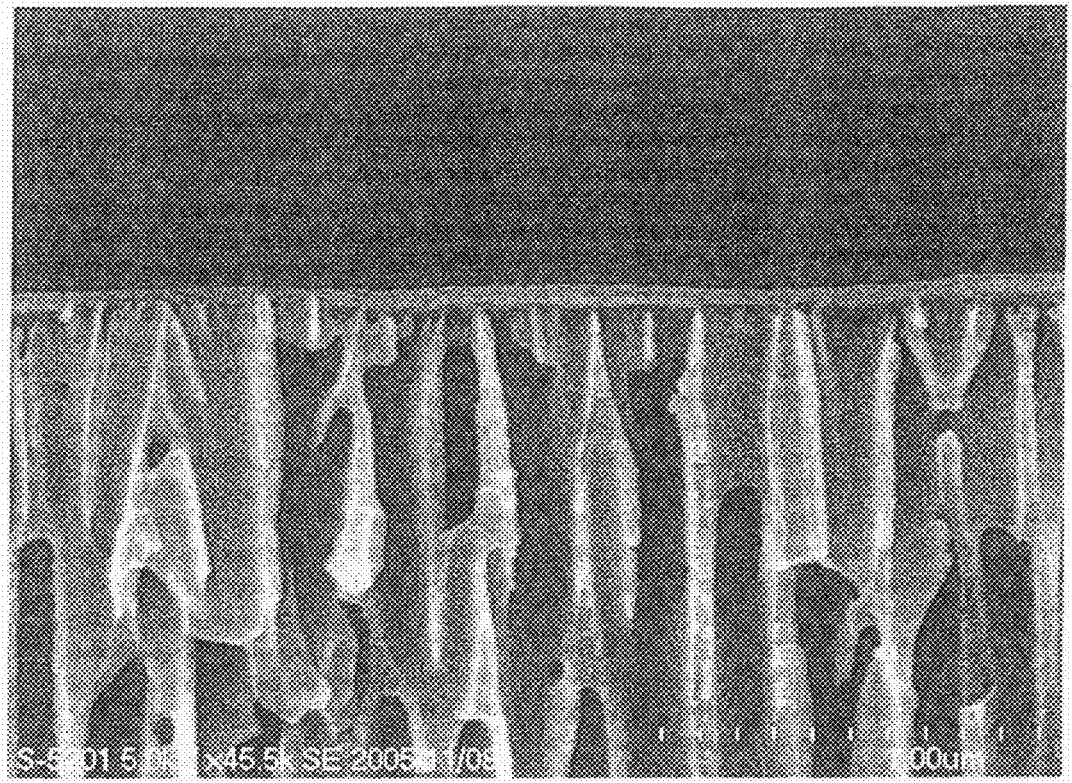
[Fig. 10]

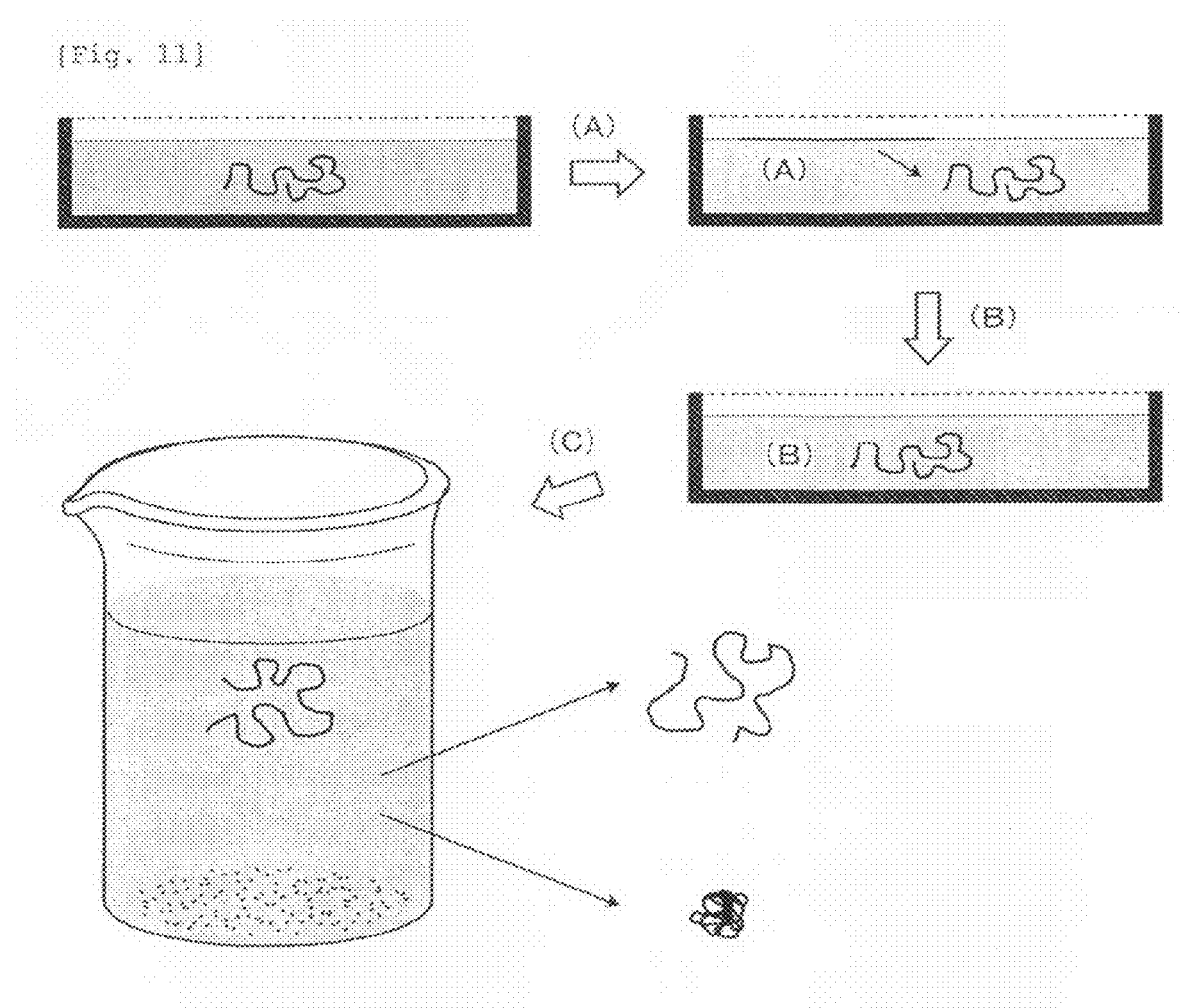

THIN FILM HAVING INTERPENETRATING NETWORK LAYER AND METHOD FOR MANUFACTURING THE THIN FILM

This application is the National Phase Application of International Application No. PCT/JP2006/324853 filed on Dec. 13, 2006, which claims priority to Japanese patent Application No. 2005-361656, filed on Dec. 15, 2005, the entire contents of which are hereby incorporated by reference.

TECHNICAL FIELD

The present invention relates to a thin film having an interpenetrating net-work layer and a method for manufacturing the thin film.

BACKGROUND ART

Since composite materials constituted of an organic compound and a metal oxide can be expected to have mechanical, physical and chemical characteristics which are not owned by each of the materials, the development of such composite materials is keenly required in various fields. In particular, since composite materials composed of a polymer compound and a metal oxide have a mechanical characteristic combining toughness of the polymer and rigidity of the oxide, they are ranked as one of important materials of today. The composite materials composed of a polymer compound and a metal oxide are excellent in elasticity, abrasion resistance and chemical stability and are also expected as a tire or a shield material in the future. Furthermore, metal oxides containing an organic molecule are studied for applications over a wide range of from coloration of general-purpose materials to novel optical elements.

Now, the majority of characteristics of such composite materials become substantially valuable first time when fabricated in a thin film. For example, in the semiconductor industry of today, high integration of a layer of an electronic device is an important technical goal. But, in order to achieve this goal, a stable insulating thin film whose thickness is controlled at a nano level is absolutely essential. Also, in precision electronic instruments where mechanical friction is generated, such as hard disks, it is considered that a thin film having characteristics of adequate softness and abrasion resistance both of which conflict with each other at a glance is necessary.

As the thin film complying with these requirements, Patent Document 1 (PCT International Publication Pamphlet No. WO 03/095193) discloses a thin film constituted of a thin film layer of a polymer having a hydroxyl group or a carboxyl group on the surface thereof and a metal oxide thin film layer or an organic/metal oxide composite thin film layer which binds coordinately or covalently with the thin film layer of a polymer utilizing the hydroxyl group or carboxyl group and having a whole thickness of not more than 300 nm. This PCT International Publication Pamphlet No. WO 03/095193 also discloses a method for manufacturing such a thin film.

However, in the method described in PCT International Publication Pamphlet No. WO 03/095193, the organic layer and the inorganic layer are bound with each other by a coordinate bond or covalent bond of a carboxyl group or a hydroxyl group. For that reason, the organic layer and the inorganic layer are independent from each other, and when it is intended to keep strength and flexibility while making the film thin in thickness, there is generated a limit.

Now, in general, the more the surface area of a film is increased, the more a defect is easily generated on the film surface. For that reason, it is well known that there may be the case where a manufacturing method which can be applied in the case of manufacturing a film with a small surface area cannot be applied in the case of manufacturing a film with a large surface area. In particular, when it is intended to manufacture a film with a large surface area which is excellent in strength and flexibility, an additional problem tends to attend thereon.

Actually, an example for successfully manufacturing an ultra-thin film with a large surface area which is excellent in all of strength, durability and flexibility has not been known yet.

Patent Document 1: PCT International Publication Pamphlet No. WO 03/095193

DISCLOSURE OF THE INVENTION

Problems that the Invention is to Solve

The invention is aimed to solve the foregoing problems and to provide a thin film having self-supporting properties and having excellent strength, durability and flexibility.

Also, the invention is aimed to provide a method for manufacturing the thin film.

Means for Solving the Problems

In view of the foregoing problems, the present inventor made extensive and intensive investigations and has successfully formed an IPN structure in a thin film, resulting in solving the foregoing problems by the following measures.

(1) A thin film having an interpenetrating net-work layer and having a film thickness of 500 nm or less, the interpenetrating net-work layer being constituted of at least a metal oxide and an organic polymer.

(2) The thin film as set forth in (1), wherein the interpenetrating net-work layer is provided on a support.

(3) The thin film as set forth in (1) or (2), wherein the film thickness is 100 nm or less.

(4) The thin film as set forth in any one of (1) to (3), which has a surface area of 1 $cm^2$ or more.

(5) The thin film as set forth in any one of (1) to (4), which has self-supporting properties.

(6) The thin film as set forth in any one of (1) to (5), which has strength so as to endure a weight of 100 times or more of the weight of the thin film.

(7) The thin film as set forth in any one of (1) to (6), wherein the metal oxide is a zirconium-containing compound or a silicon-containing compound.

(8) The thin film as set forth in any one of (1) to (7), wherein the organic polymer is an acrylate based resin.

(9) The thin film as set forth in any one of (1) to (8), wherein the support is a vinyl based resin.

(10) A thin film having the thin film as set forth in any one of (1) to (9) and having an amphipathic substance attached on the surface thereof.

(11) A thin film having an amphipathic substance-containing flowable layer on the surface of the thin film as set forth in any one of (1) to (9).

(12) The thin film as set forth in (11), wherein the amphipathic substance is a surfactant, a lipid or a lipid analog.

(13) The thin film as set forth in any one of claims (10) to (12), which is in a dispersed state in pure water.

(14) A method for manufacturing a thin film having an interpenetrating net-work layer, with the interpenetrating net-work layer being constituted of at least a metal oxide and an organic polymer, which includes forming a thin film layer composed of a composition containing a metal oxide precursor and an organic monomer on a base material composed of at least one layer; and subjecting the metal oxide precursor to a sol-gel reaction to convert it into a metal oxide and polymerizing the organic monomer during the progress of the sol-gel reaction to convert the thin film layer into an interpenetrating net-work layer.

(15) The method for manufacturing a thin film as set forth in (14), wherein the organic monomer is photopolymerized upon light irradiation.

(16) The method for manufacturing a thin film as set forth in (14) or (15), wherein after a part of the sol-gel reaction has proceeded, the polymerization of the organic monomer is started.

(17) The method for manufacturing a thin film as set forth in any one of (14) to (16), wherein the base material has a substrate, an undercoat layer and a support in this order, and the method comprises, after forming the interpenetrating net-work layer, separating the undercoat layer and the support from each other.

(18) The method for manufacturing a thin film as set forth in (17), wherein the base material has a substrate, an undercoat layer and a support in this order, and the method comprises, after forming the interpenetrating net-work layer, solving the undercoat layer.

(19) The method for manufacturing a thin film as set forth in anyone of (14) to (18), wherein at least a part of the sol-gel reaction is allowed to proceed during the formation of the thin film layer.

(20) The method for manufacturing a thin film as set forth in any one of (14) to (19), wherein the thin film layer is formed by spin coating the composition.

(21) The method for manufacturing a thin film as set forth in (20), wherein at least a part of the sol-gel reaction is allowed to proceed with moisture in air during the spin coating.

(22) The method for manufacturing a thin film as set forth in any one of (14) to (21), wherein the metal contained in the metal oxide precursor is zirconium or silicon.

(23) The method for manufacturing a thin film as set forth in any one of (14) to (22), wherein at least a part of converting the thin film layer into an interpenetrating net-work layer is carried out in air at from 10 to 60° C.

(24) The method for manufacturing a thin film as set forth in any one of (14) to (23), wherein the thin film having an interpenetrating net-work layer is the thin film as set forth in (1).

(25) The method for manufacturing a thin film as set forth in any one of (14) to (24), wherein the thin film having an interpenetrating net-work layer is the thin film as set forth in any one of (2) to (9).

ADVANTAGES OF THE INVENTION

By employing the invention, an IPN thin film which is excellent in all of durability, strength and flexibility and which has self-supporting properties was obtained. In particular, the invention is extremely useful on the point that a conventional problem that an IPN thin film having excellent durability and strength lacks flexibility, whereas a thin film having excellent flexibility lacks durability and strength could be completely solved.

Furthermore, by employing the invention, a thin film which extremely hardly causes damages such as a crack can be obtained. As a result, it has become easy to obtain a thin film with a large surface area. In particular, the invention is extremely superior on the point that a conventional problem involved in the preparation of a thin film that in the case where the surface area is small, whatever a thin film which is low in damages can be prepared, when the surface area is large, a thin film which is low in damages is hardly manufactured is avoided.

Moreover, the thin film obtained by the invention has an advantage that various works become easier because the surface of the film can be arbitrarily adjusted so as to have hydrophilicity or hydrophobicity.

BRIEF DESCRIPTION OF THE DRAWINGS

FIG. 1 shows one example of an embodiment of the method for manufacturing an IPN thin film of the invention.

FIG. 2 shows an IR spectrum of an IPN thin film (A-1) in Example 1.

FIG. 3 shows a photograph of an IPN thin film (A-1) and a silicon substrate to be used in the manufacture of an IPN thin film (A-1) in Example 1.

FIG. 4 is photographs showing the result of the SEM observation of an IPN thin film (A-1) in Example 1.

FIG. 5 is photographs by the TEM observation of an IPN thin film (A-1) in Example 1.

FIG. 6 is photographs by the AFM observation of an IPN thin film (A-1) in Example 1.

FIG. 7 shows the result of an XPS spectrum of an IPN thin film (A-1) in Example 1.

FIG. 8 is a photoemission electron microscopic photograph showing the behavior of sucking up an IPN thin film (A-1) in Example 1 by a micro pipette (aperture of tip: 160 µm).

FIG. 9 shows a photograph by the SEM observation of an IPN thin film (B) in Example 3.

FIG. 10 shows a photograph by the SEM observation of an IPN thin film (D) in Example 3.

FIG. 11 shows a scheme of works to be carried out in Example 4.

DESCRIPTION OF REFERENCE NUMERALS AND SIGNS

1: Substrate
2: Undercoat layer
3: Support
4: Laminate of substrate, undercoat layer and support
5: Thin film layer
6: Shearing force of air
7: Centrifugal force
8: IPN layer
9: Light irradiation
10: IPN thin film

BEST MODES FOR CARRYING OUT THE INVENTION

The contents of the invention are hereunder described in detail. In the specification of this application, the term "to" is used so as to mean that the numerical values described before and after it are included as a lower limit and an upper limit, respectively.

In the specification of this application, the "surface area" of the film refers to an area of one surface of the film (film surface). In one film, when the area is different between the respective film surfaces, an area of a smaller film surface is usually defined as the surface area of the film. This is because in the case of actual utilization, a film adapted for a surface area of the smaller film surface is usually utilized as the film. However, this does not apply in the case where the film is not utilized in the foregoing manner.

In the specification of this application, the terms "self-supporting properties" mean properties that when the thin film of the invention is, for example, manufactured on a substrate, a three-dimensional form the same as that before removing the substrate is kept and further that after removing the substrate, the thin film does not cause irreversible coagulation in a block state and is neither broken into small pieces nor cracked at the time of use.

Also, in the specification of this application, the interpenetrating net-work may be sometimes referred to as "IPN"; and the thin film having an interpenetrating net-work layer may be sometimes referred to as "IPN thin film".

The IPN thin film of the invention is a thin film having an IPN layer containing, as major components, a metal oxide and an organic polymer.

The "IPN layer" as referred to herein is a layer having a structure in which, for example, net-works of a metal oxide and an organic polymer are partially interwoven at least on a molecular scale and though not bound with each other by a covalent bond, can not be cut and divided from each other without cleaving a chemical bond.

The "net-work" refers to a polymer having a number of highly branched and closed routes.

The method for manufacturing an IPN thin film of the invention is hereunder described.

FIG. 1 shows one example of an embodiment of the method for manufacturing an IPN thin film of the invention while referring to every step. In FIG. 1, a base material is prepared in Step (1). Specifically, an undercoat layer 2 is provided on a substrate 1, and a support 3 is provided on this undercoat layer. In the method for manufacturing an IPN thin film of the invention, these steps are not an essential requirement, and for example, it is also possible to carry out works as described later using a laminate 4 in which a substrate, an undercoat layer and a support are laminated in order. Also, the base material does not necessarily have a three-layered structure, and so far as the gist of the invention is not deviated, the base material may be a base material not containing any one of a substrate, an undercoat layer and a support, or conversely, it may be a base material containing other layer.

For example, the substrate serves as a basis in the case of manufacturing the IPN thin film of the invention, and when the substrate is a substrate having a smooth surface, its material quality and properties of the surface are not particularly limited. Specific examples thereof include solids composed of an inorganic material such as a metal, for example, silicon and aluminum, glass, titanium oxide and silica; and solids composed of an organic material such as acrylic boards, polystyrene, cellulose, cellulose acetate and phenol resins.

Also, so far as the gist of the invention is not deviated, in the method for manufacturing an IPN thin film of the invention, the substrate may not be used. For example, this is the case where the undercoat layer or support is strong material as described later.

The undercoat layer is favorably used for the purpose of separating the IPN layer provided on the support and the substrate from each other. For example, it is preferable that after forming the IPN layer as described later, the undercoat layer and the support are separated from each other. By employing such a measure, the substrate and the support-IPN layer laminate (IPN thin film) can be separated from each other. The "separation" as referred to herein also includes "dissolution" of the undercoat layer. In particular, in the invention, it is more preferable that the undercoat layer is dissolved, thereby separating the IPN thin film from the substrate. Also, the undercoat layer may be constituted such that the undercoat layer doubles as the substrate. In that case, the IPN thin film is obtained by dissolution of the undercoat layer.

Accordingly, it is desirable to choose, as the undercoat layer, a material which is not easily soluble in a solvent to be used for the fabrication of the thin film layer to be subsequently carried out but easily soluble in other solvent. For example, when the solvent to be used for the fabrication of the thin film layer is water, polyvinylphenols and polyvinylphenol based polymers for photoresist, all of which are insoluble in water but easily soluble in ethanol; polymethyl methacrylate, polyvinyl acetate and hydroxypropylmethyl cellulose phthalate, all of which are soluble in acetone, etc.; polystyrene which is soluble in chloroform, etc.; and the like are suitable. The undercoat layer can be laminated on the substrate employing a spin coating method or the like.

For example, the support is used for the purpose of making the surface of the obtained IPN thin film smoother. In particular, the support is used for the purpose of making it compatible with the metal oxide. Accordingly, it is preferable that the support is a polymer having a hydroxyl group or a carboxyl group on the surface thereof.

Specific examples thereof include polyvinyl alcohol, polyvinylphenol, polyacrylic acid, polymethacrylic acid, poly(2-hydroxyethyl methacrylate), polyglutamic acid, polyserine, amylose and colominic acid, with polyvinyl alcohol and poly (2-hydroxyethyl methacrylate) being more preferable.

The amount of the hydroxyl group or carboxyl group on the support surface is preferably in the range of from $5.0 \times 10^{13}$ to $5.0 \times 10^{14}$ equivalents/cm$^2$, and more preferably from $1.0 \times 10^{14}$ to $2.0 \times 10^{14}$ equivalents/cm$^2$.

The IPN thin film of the invention may have a support or may be one from which the support has been removed. However, in the case where the IPN thin film has a support, it is preferable that the support does not hinder the purposes of the IPN thin film of the invention. That is, in the case of laminating with the IPN layer to fabricate the IPN thin film of the invention, it is preferable that the IPN thin film is a thin film having self-supporting properties and having excellent strength, durability and flexibility. In that case, the thickness of the support is preferably 30% or less, and more preferably 20% or less of the whole thickness of the IPN thin film.

In FIG. 1, Step (2) is a step of forming a thin film layer 5 composed of a composition containing a metal oxide precursor and an organic monomer (composition for IPN). The method for forming a thin film layer is not particularly specified, and general methods for thinning the composition for IPN can be widely employed. Also, the thin film layer includes not only a so-called solidified thin film but a film prepared by fabricating a liquid in a stratiform state, and it is usually a film in a liquid state. That is, in general, the IPN layer is formed by subjecting the thin film layer to a measure as described later.

Specifically, the formation of a thin film layer is preferably achieved by coating the composition for IPN on the substrate, and more preferably achieved by a spin coating method.

When the spin coating method is employed, an IPN thin film having a smoother surface can be obtained due to a shearing force 6 of air to be generated during the spin coating. Also, a centrifugal force 7 is generated, and as a result, there is an advantage that excessive components are eliminated, whereby thinning proceeds.

Also, the IPN layer may be not always uniform in the state of Step (2). In the case where the IPN layer is not uniform, there is an advantage that in separating the undercoat layer and the support from each other, the separation is more easily achieved.

Here, the metal oxide precursor is not particularly specified so far as it can be converted into a metal oxide due to a sol-gel reaction. The metal to be contained in the metal oxide precursor is preferably silicon, zirconium, titanium, aluminum or niobium, and more preferably silicon or zirconium. A metal oxide precursor containing silicon or zirconium is preferable because the organic monomer is easily polymerizable therewith.

Specifically, preferred examples thereof include metal alkoxides, for example, metal alkoxides such as tetraethylsilane ($Si(OEt)_4$), silicon tetraisocyanate ($Si(OCN)_4$), titanium butoxide ($Ti(O^nBu)_4$), zirconium butoxide ($Zr(O^nBEu)_4$), zirconium propoxide ($Zr(O^nPr)_4$), aluminum butoxide ($Al(O^nBu)_4$) and niobium butoxide ($Nb(O^nBu)_5$); metal alkoxides having two or more alkoxyl groups such as methyltrimethoxysilane ($MeSi(OMe)_3$) and diethyldiethoxysilane ($Et_2Si(OEt)_2$); metal alkoxides having a ligand and having two or more alkoxyl groups such as acetylacetone; and double alkoxide compounds such as $BaTi(OR)_x$. Here, n and x are each an integer.

Also, besides the foregoing metal alkoxides, fine particles of an alkoxide gel obtained by adding a small amount of water to the metal alkoxide and partially hydrolyzing and condensing the mixture; binuclear or cluster' type alkoxide compounds having plural or plural types of metal elements, such as a titanium butoxide tetramer ($^nBuO[Ti(O^nBu)_2O]_4{}^nBu$); polymers on the basis of a metal alkoxide compound crosslinked via an oxygen atom such as sodium silicate; solutions containing two or more types of metal oxide precursors such as sodium metasilicate ($Na_2SiO_3$) and aluminum nitrate ($Al(NO_3)_9$); and the like can be used.

Furthermore, in the invention, a metal complex capable of chemically adsorbing with a hydroxyl group on a solid surface and newly generating a hydroxyl group on the surface by hydrolysis or the like can also be used as the metal oxide precursor. Specifically, metal halides such as cobalt chloride ($CoCl_2$) metal carbonyl compounds such as titanium oxoacetyl acetate ($TiO(AcAc)_2$) (Ac represents an acetyl group) and pentacarbonyliron ($Fe(CO)_5$); and polynuclear clusters thereof can be used as the metal complex.

In the invention, it is also possible to form a composite metal oxide thin film on a solid surface using a combination of two or more types of metal oxide precursors as the need arises. For example, a combination of two or more types of the foregoing metal oxide precursors such as sodium metasilicate ($Na_2SiO_3$) and aluminum nitrate ($Al(NO_3)_3$) can be used.

The content of the metal oxide precursor is preferably from 20 to 80% by volume in the IPN composition (exclusive of the solvent).

So far as the gist of the invention is not deviated, the organic monomer is not particularly specified. Any known organic monomer capable of being polymerized in the presence of a polymerization initiator to form an IPN layer together with the metal oxide precursor (metal oxide) can be employed without limitations.

The organic monomer is preferably an organic monomer having a hydroxyl group, and more preferably an organic monomer such that an organic polymer formed from the organic monomer is hydrophilic.

Specifically, examples thereof include acrylic monomers and other vinyl monomers. Of these, acrylic monomers are preferable from the viewpoint of good polymerizability.

Examples of acrylic monomers include 2-hydroxyethyl (meth)acrylate, 2-hydroxypropyl(meth)acrylate, 3-chloro-2-hydroxypropyl(meth)acrylate, tetrahydrofurfuryl(meth) acrylate, 2-hydroxy-3-phenoxypropyl(meth)acrylate, diethylene glycol(meth)acrylate, polyethylene glycol mono (meth)acrylate, polypropylene glycol mono(meth)acrylate, N-methylol(meth)acrylamide, ethyl carbitol acrylate, tripropylene glycol(meth)acrylate, 1,4-butylene glycol mono (meth)acrylate, glycerol mono(meth)acrylate, 2-hydroxyethyl acryloyl phosphate, 4-hydroxybutyl acrylate, caprolactone-modified 2-hydroxyethyl acrylate, 2-acryloyloxyethyl succinate and allyl alcohol.

The organic monomer may be of a single kind or two or more kinds.

The content of the organic monomer is preferably from 20 to 60% by volume in the IPN composition (exclusive of the solvent).

The IPN composition may contain a polymerization initiator for the purpose of polymerizing the organic monomer. Any known polymerization initiator can be employed without particular limitations so far as it does not hinder the formation of the IPN layer. Accordingly, the type and content of the polymerization initiator are properly chosen according to the type of the organic monomer to be used or the type of the metal oxide precursor.

For example, as described later, in the case of polymerizing the monomer by photopolymerization, a photopolymerization initiator is used. Examples of the photopolymerization initiator include 4-phenoxydichloroacetophenone, 4-t-butyl-dichloroacetophenone, diethoxyacetophenone, 2-hydroxy-2-methyl-1-phenylpropan-1-one, 1-(4-isopropylenephenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 1-hydroxycyclohexylphenylketone, 2-methyl-1-[4-(methylthio)phenyl]-2-morpholinopropane-1, benzoin, benzoinmethyl ether, benzomethyl ether, benzoinisopropyl ether, benzoinisobutyl ether, benzyl dimethyl ketal, benzophenone, methyl benzoate, benzoylbenzoic acid, methyl benzoylbenzoate, 4-phenylbenzophenone, hydroxybenzophenone, 4-benzoyl-4'-methyldiphenyl sulfide, 3,3'-dimethyl-4-methoxybenzophenone, thioxanthone, 2-chlorothioxanthone, 2-methylthioxanthone, 2,4-dimethylthioxanthone, isopropylthioxanthone, camphorquinone, dibenzosuberone, 2-ethylanthraquinone, 4',4''-diethylisophthalophenone, 3,3', 4,4'-tetra(t-butylperoxycarbonyl)benzophenone, α-acyloxime ester, acylphosphine oxide, methylphenyl glyoxylate, benzil, 9,10-phenanthrenequinone, 4-(2-hydroxyethoxy)phenyl-(2-hydroxy-2-propyl)ketone and 2,4,6-trimethylbenzoyl-diphenyl-phosphine oxide.

The content of the polymerization initiator is preferably from 0.1 to 5% by volume in the IPN composition (exclusive of the solvent).

In the IPN composition, triethanolamine, triisopropanolamine, 4,4'-dimethylaminobenzophenone (Michler's ketone), 4,4'-diethylaminobenzophenone, 2-dimethylaminoethylbenzoic acid, ethyl 4-dimethylaminobenzoate, (n-butoxy)ethyl 4-dimethylaminobenzoate, isoamyl 4-dimethylaminobenzoate, 2-ethylhexyl 4-dimethylaminobenzoate, 2,4-diethylthioxanthone, 2,4-diisopropylthioxanthone or the like can be jointly used as an auxiliary of the polymerization initiator as the need arises.

Furthermore, in the IPN composition, a crosslinking agent may be jointly used. Examples of the crosslinking agent include acrylic ester based compounds such as hexanediol di(meth)acrylate, (poly) ethylene glycol di(meth)acrylate, (poly)propylene glycol di(meth)acrylate, neopentyl glycol di(meth)acrylate, pentaerythritol di(meth)acrylate, trimethylolpropane tri(meth)acrylate, pentaerythritol tri(meth)acrylate and dipentaerythritol hexa(meth)acrylate, and besides, epoxy acrylates, polyester acrylates and urethane acrylates.

The content of the crosslinking agent is preferably from 0.1 to 5% by volume in the IPN composition (exclusive of the solvent).

A content ratio of the metal oxide precursor and the organic monomer in the IPN composition can be properly determined according to the use of the IPN thin film, the types of the organic monomer and the metal oxide precursor and the like. Generally, the both are blended in the ratio of 1/2 to 2/1 (volume ratio).

Also, a concentration of solids in the IPN composition (concentration of the components exclusive of the solvent) is preferably 15% by volume or less. What the concentration falls within this range is preferable because it is easy to more uniformly apply the IPN composition by a spin coating method. Also, by adjusting the concentration of the IPN solids in the IPN composition, the thickness of the film can be adjusted. Usually, by regulating the concentration of the solids at from 3 to 5% by volume, it is possible to prepare a thin film of from 30 to 40 nm.

As the solvent to be used in the IPN composition, for example, in the case of metal alkoxides, in general, methanol, ethanol, propanol, toluene, carbon tetrachloride, chloroform, cyclohexane, benzene and the like can be used singly or as combined. However, solvents which easily dissolve the support therein should be avoided. The foregoing content of each of the components in the IPN composition expresses one in the solvent-free state.

Also, it is preferable that in the IPN composition (exclusive of the solvent), the components other than the solvent, such as the metal oxide precursor, the organic monomer and the polymerization initiator, are contained in the proportion of 5% by mole or less in the solvent.

In FIG. 1, Step (3) is a step of forming an IPN layer 8. In this step, the metal oxide precursor is converted into a metal oxide through a sol-gel reaction, and during the sol-gel reaction, the organic monomer is polymerized, whereby forming an interpenetrating net-work layer of the metal oxide and the organic monomer. In this embodiment, the organic monomer is photopolymerized upon light irradiation 9. As a matter of course, it is needless to say that the organic monomer may be polymerized by a method other than the photopolymerization.

Sol-Gel Reaction

The metal oxide precursor forms a metal oxide net-work through a sol-gel reaction. Here, the sol-gel reaction can be carried out by a known method. For example, in the case where the composition for IPN is coated by a spin coating method, the sol-gel reaction can be advanced by achieving the spin coating in an aqueous atmosphere (for example, in a water-containing atmosphere or in water vapor). Since air contains water vapor, the spin coating can be carried out in air, too. The sol-gel reaction in air is effective in the case of using a metal oxide precursor having high reactivity with water. In addition, in the case where the support has a hydroxyl group, the sol-gel reaction can also be advanced by the hydroxyl group of the support. Furthermore, it is also possible to largely shorten a time necessary for the sol-gel reaction using a catalyst such as acids and bases.

In the invention, it is possible to arbitrarily adjust the thickness at a nano level by altering the concentrations of the metal oxide precursor and the organic monomer in the composition to be used for the spin coating, the spin speed and the spin time.

It is preferable that at least a part of the sol-gel reaction is advanced during the formation of the thin film layer. It is more preferable that the gel-gel reaction is advanced over during the formation of the thin film layer and after the formation of the thin film layer. By employing such a measure, there is an advantage that a thin film with high uniformity can be obtained.

In the invention, the organic polymer portion of the IPN layer is formed by a polymerization reaction of the organic monomer. Here, the polymerization is carried out by photopolymerization upon light irradiation or the like. In the method of the invention, the polymerization can be achieved at a relatively low temperature (for example, from 10 to 60° C.), and therefore, it can be easily carried out at the same time of the sol-gel reaction.

Furthermore, as described previously, since the polymerization and the sol-gel reaction of the invention can be advanced at atmospheric pressure, and therefore, the invention is favorable on the point that a large-sized reaction apparatus or the like is not necessary. In addition, it is possible to prepare a thin film within a short period of time. Also, the polymerization reaction (especially the light irradiation for photopolymerization) is preferably carried out in a nitrogen atmosphere or an argon atmosphere. By employing such a measure, the polymerization reaction smoothly proceeds, and therefore, such is preferable. In that case, it is preferable that the spin coating or the like is performed within a reactor or the like.

Moreover, for example, after performing a part of the sol-gel reaction in air or in an aqueous atmosphere, the light irradiation may be performed by transferring the atmosphere into a nitrogen atmosphere. In that case, the remaining sol-gel reaction also is advanced due to the residual water vapor. By employing such a measure, the control of the polymerization becomes easier, and therefore, such is preferable.

The polymerization of the organic monomer is carried out during a time of advancing the sol-gel reaction. That is, the polymerization may be advanced at the same time of the sol-gel reaction or may be achieved only during a certain period of time of the progress of a part of the sol-gel reaction.

Preferably, it is favorable that the polymerization is started after a part of the sol-gel reaction has proceeded. For example, in the case of the photopolymerization, it is preferable that the light irradiation is started after a part of the sol-gel reaction has proceeded. More preferably, it is favorable that the light irradiation is started at a point of time when from 5 to 10% of the time necessary for the sol-gel reaction has elapsed. By employing such a measure, the sol-gel reaction and the polymerization reaction proceed at the same time, whereby a more excellent IPN layer is obtained.

Furthermore, in the case where a spin coating method is employed for the formation of a thin film layer, it is preferable that the sol-gel reaction and the light irradiation are started during the spin coating. In particular, it is preferable that the light irradiation is started at a point of time when from 5 to 10% of the time necessary for the spin coating has elapsed.

Also, it is preferable that the time necessary for the sol-gel reaction and the time necessary for the light irradiation are substantially the same time (for example, a difference between the respective necessary times is within ±10%). By employing such a measure, a more excellent IPN layer is obtained.

In FIG. 1, Step (4) is a step of dissolving the undercoat layer to separate the substrate 1 and the support-IPN layer laminate (IPN thin film 10) from each other. This step is not always an essential requirement in the method for manufacturing an IPN thin film of the invention. That is, this is because so far as the base material-IPN thin film laminate complies with the use as the IPN thin film, it is not particularly required to be removed.

The work method of this step can be achieved while taking into consideration the description of PCT International Publication Pamphlet No. WO 03/095193 in addition to those described previously.

In the IPN layer laminate of the IPN thin film of the invention, the metal oxide preferably accounts for from 10 to 80% by mole, and more preferably accounts for from 25 to 60% by mole. In particular, in the case of using a zirconium-containing compound, the proportion of the metal oxide is preferably from 25 to 50% by mole; and in the case of using a silicon-containing compound, the proportion of the metal oxide is preferably from 25 to 80% by mole. By regulating the proportion of the metal oxide in this range, a more uniform film is obtained. Also, in the case where the manufacture is performed by the method of the invention, the separation from the base material becomes more satisfactory.

Also, in the IPN laminate of the IPN thin film of the invention, the organic polymer preferably accounts for from 20 to 90% by mole, and more preferably accounts for from 20 to 75% by mole.

In the IPN thin film obtained by the method for manufacturing an IPN thin film of the invention, for example, the film thickness can be regulated at a nano level or less, preferably 500 nm or less, more preferably 300 nm or less, further preferably 100 nm or less, and especially preferably 50 nm or less. So far as the gist of the invention is not deviated, its lower limit is not particularly specified but can be set up at, for example, 5 nm or more. In accordance with conventionally known manufacturing methods of an IPN structure, a structure having an IPN layer in a thin film state as in the invention could not be manufactured. It has become possible to manufacture the IPN thin film in the invention employing the foregoing method for manufacturing an IPN thin film.

Also, in the IPN thin film obtained by the method for manufacturing an IPN thin film of the invention, for example, the surface area can be regulated at 1 $cm^2$ or more, and further 10 $cm^2$ or more. The thinner the film thickness, or the larger the surface area, the more likely the thin film is damaged from a crack or the like. However, by employing the method for manufacturing an IPN thin film of the invention, it has become possible to manufacture an IPN thin film having such a large surface area.

Furthermore, by employing the method for manufacturing an IPN thin film of the invention, an IPN thin film having self-supporting properties and having excellent flexibility, durability and strength can be obtained.

In particular, according to the method for manufacturing an IPN thin film of the invention, it is possible to manufacture an IPN thin film capable of enduring a weight of 100 times or more, and further 1,000 times or more of the weight of the thin film. The weight as referred to herein means a weight to be applied per unit area relative to the weight of the IPN thin film per the unit area. Also, the term "endure" refers to the matter that when the weight is applied, a damage of the IPN thin film or the like is not observed.

Moreover, according to the method for manufacturing an IPN thin film of the invention, it is possible to manufacture a thin film which even when the film is shrunken by folding to an extent of 1/10,000 times or more (preferably 1/30,000 times or more) of the area of the IPN thin film or other method and then extended, has self-supporting properties without causing a damage of the film.

In addition, the IPN thin film obtained by the method for manufacturing an IPN thin film of the invention can have durability of keeping these characteristics over, for example, at least a half year or more.

The IPN thin film of the invention can be used as a thin film having, for example, electrical or electronic characteristic, magnetic characteristic, optical function characteristic, permeation/separation properties, etc.

In the IPN thin film of the invention, an amphipathic substance can be attached on the surface thereof. Here, the term "attach" means the matter that an amphipathic substance is attached to the surface of the IPN thin film and is in the state that it is not separated unless a physical or chemical treatment is applied.

In the IPN thin film of the invention, a flowable layer containing an amphipathic substance can be provided on the surface thereof. The IPN thin film obtained by the method for manufacturing an IPN thin film of the invention is usually hydrophobic on the surface thereof, and when dipped in ethanol, it is dispersed therein, whereas it is coagulated in water so that there may be the case where it is not adaptive with various works. Also, when the IPN thin film of the invention is dipped in pure water, it spreads at an interface with the liquid so that there may be the case where it is broken or coagulated. Then, for example, by dipping the IPN thin film of the invention in an aqueous solution containing an amphipathic substance and then dipping it in water, a flowable layer containing an amphipathic substance can be provided on the surface thereof, and it also becomes possible to achieve a work in water.

For the purpose of providing a flowable layer with more ease, measures such as an increase of the viscosity of the aqueous solution containing an amphipathic substance, an increase of the density of the amphipathic substance in the aqueous solution and a lowering of the temperature of the aqueous solution containing an amphipathic substance can be employed. As a measure for increasing the viscosity of the aqueous solution containing an amphipathic substance, the addition of glycerin, ethylene glycol or the like may be thought. In particular, a method in which an IPN thin film is dipped in a solution which is an amphipathic substance-containing aqueous solution to which a substance capable of increasing the viscosity of the aqueous solution is added, dipped in an amphipathic substance-containing aqueous solution (free from a substance capable of increasing the viscosity of the aqueous solution) and then further dipped in water is preferable.

The amphipathic substance is not particularly specified so far as it is able to provide a flowable layer on the surface of the IPN thin film of the invention, and a surfactant, a lipid and a lipid analog can be used. The "lipid analog" as referred to herein means a substance which when dispersed in water, it is able to spontaneously form a bimolecular structure.

Brij 35, PGME 10, PGME 20, PGME 50, TWEEN 20 and the like can be used as the surfactant.

Di-n-dodecyldimethylammonium bromide (DDAB), di-n-decyl maleic acid sulfate ($SC_{10}MAS$), di-n-tetradecyl maleic acid sulfate ($SC_{14}MAS$), di-n-dodecyl maleic acid sulfate ($SC_{12}MAS$) and the like can be used as the lipid or lipid analog.

EXAMPLES

The invention is more specifically described below with reference to the Examples. So far as the gist of the invention is not deviated, materials, use amounts, proportions, treatment contents, treatment procedures and the like described in the following Examples can be properly changed. Accordingly, it should not be construed that the scope of the invention is limited to the following specific examples.

Example 1

An IPN layer was configured according to the method shown in FIG. 1.

(Step (1))

A polyvinylphenol (PVPh) layer having a thickness of 100 nm was formed on a surface-treated silicon substrate (silicon wafer) (manufactured by Sumco Corporation) by a spin coating method. PVPh (manufactured by Aldrich) as used herein has a weight average molecular weight (Mw) of about 8,000 g/mole and high solubility in ethanol. Next, a polyvinyl alcohol (PVA) layer having a thickness of 5 nm was spin coated on the surface of the PVPh layer (layer thickness: 5 nm). PVA as used herein is one having been hydrolyzed in a proportion of 98% by mole and having a weight average molecular weight (Mw) of about 78,000 g/mole and is hydrophilic.

(Steps (2) to (3))

Next, a composition for IPN (A-1) prepared by dissolving 4-hydroxybutyl acrylate (manufactured by Acros Organics), hexanediol diacrylate (crossing agent) (manufactured by Alfa Aesar), zirconium tetrabutoxide (manufactured by Kanto Chemical Co., Inc.) and a photopolymerization initiator (manufactured by Kyoritsu Chemical & Co., Ltd.) in a proportion shown in Table 1 in chloroform (solvent) (5 mL) was spin coated on the PVA layer obtained in Step (1), thereby configuring a thin film layer (A-1). The spin coating was carried out at rpm for 2 minutes (Step (2)).

TABLE 1

Photopolymerization Initiator

[Ka 1]

| Composition for IPN | $Zr(BuO)_4$ | HOBuA | HDODA | Polymerization initiator |
|---|---|---|---|---|
| (A-1) | 26.8 mol % | 69.9 mol % | 1.79 mol % | 1.43 mol % |
|  | 50.0 vol % | 47.1 vol % | 1.95 vol % | 0.95 vol % |
| (A-2) | 42.3 mol % | 55.2 mol % | 1.41 mol % | 1.13 mol % |
|  | 66.67 vol % | 31.4 vol % | 1.30 vol % | 0.64 vol % |
| (A-3) | 52.4 mol % | 45.5 mol % | 1.17 mol % | 0.93 mol % |
|  | 75.0 vol % | 23.6 vol % | 0.97 vol % | 0.48 vol % |

In Table 1, $Zr(BuO)_4$, HOBuA and HDODA represent zirconium tetrabutoxide, 4-hydroxybutyl acrylate and hexanediol diacrylate, respectively.

In Table 1, the content of chloroform is not described. This is because chloroform in the composition for IPN is ultimately vaporized, and therefore, for the sake of convenience, the contents are expressed as reduced into a state that the amount of chloroform is not included.

After mixing the foregoing components, for the purpose of dispersing the respective components, the composition for IPN (A-1) was stirred for several hours.

After ten seconds after starting the spin coating, irradiation with ultraviolet rays (wavelength: 365 nm, 23 mW/cm$^2$) was started. The light irradiation time was set up at 110 seconds. After completion of the spin coating (two minutes after starting the spin coating), the resulting sample was allowed to stand in water at 50° C. for one hour to obtain a silicon substrate-PVPh layer-PVA layer-IPN film laminate (A-1) (Step 3).

The Step (2) was performed in an air atmosphere and, thereafter, transferred into a nitrogen atmosphere and the step (3) was performed.

(Step (4))

The silicon substrate-PVPh layer-PVA layer-IPN film laminate (A-1) was dipped in ethanol. The PVPh layer was dissolved, whereby the silicon substrate and the PVA layer-IPN film laminate (IPN thin film (A-1)) were separated from each other.

An IPN thin film (A-2) and an IPN thin film (A-3) were obtained in the same manner as in the foregoing Steps (1) to (4), except for replacing the composition for IPN (A-1) with the compositions for IPN (A-2) and (A-3) shown in the foregoing Table 1, respectively.

An infrared spectrum (IR spectrum) of the IPN thin film in the case of using the composition (A-1) (hereinafter referred to as "IPN thin film (A-1)") was measured. The obtained result is shown in FIG. 2. In FIG. 2, the broken line denotes an IR spectrum of the IPN thin film (A-1); and the solid line denotes an IR spectrum obtained without performing the light irradiation. As a result, in the broken line, a reduction of a double bond peak at 810 cm$^{-1}$ was confirmed so that it was confirmed that polymerization of the organic monomer was performed. That is, it was confirmed that an organic polymer portion of the IPN layer of the IPN thin film was formed.

A photograph of the silicon substrate and the IPN thin film (A-1) separated as above is shown in FIG. 3. As is clear from FIG. 3, it was observed that the IPN thin film (A-1) (upper part) having the same size as the silicon substrate (lower part) was obtained. Also, damages such as a crack were not observed in the IPN thin film (A-1). From FIGS. 4A and 4B as described later, the thickness of the obtained IPN thin film and the thickness of the IPN layer were 35 nm and 30 nm in order, and the surface area was about 25 cm$^2$.

Also, with respect to the IPN thin film (A-2) and IPN thin film (A-3), it was confirmed that thin films free from damages such as a crack were formed (not illustrated).

(Scanning Electron Microscopy (SEM) Observation)

The IPN thin film (A-1) was transferred onto a porous alumina film and observed by a scanning electron microscope (SEM) (S-5200, manufactured by Hitachi, Ltd.). The obtained result was shown in FIGS. 4A to 4D. FIGS. 4A and 4B each shows a film side surface; and FIGS. 4C and 4D each shows a film surface. From these results, it was confirmed that the film was entirely uniform and free from a crack.

(Transmission Electron Microscopy (TEM) Observation)

The IPN thin film (A-1) was observed by a transmission electron microscopy (TEM) (JEM-2100F/SP, manufactured by JEOL Ltd.). The obtained result was shown in FIGS. 5A and 5B. FIGS. 5A and 5B each shows the result obtained by observing the surface of the IPN thin film (A-1) at a different magnification. As a result, it was confirmed that a uniform IPN thin film was formed by the organic polymer and the metal oxide.

(Atomic Force Microscopy (AFM) Observation)

The IPN thin film (A-1) was observed by an atomic force microscopy (AFM). The obtained result was shown in FIGS. 6A and 6B. FIG. 6A shows a photograph obtained by observing the surface of the IPN thin film (A-1); and FIG. 6B shows a photograph after baking the IPN thin film (A-1) at 500° C.

As is clear from FIG. 6A, no phase separation was detected, and the surface roughness was extremely small as not more than 2.5 nm.

Also, as shown in FIG. 6B, after baking the IPN thin film, not only the organic polymer was baked to lose the shape, but the metal oxide did not keep its shape and collapsed. Supposing that the metal oxide has a porous structure and that the organic polymer merely is present in the pores, it is conceived that even after baking at 500° C., the metal oxide structure remains. Therefore, the result of FIG. 6B demonstrates that the IPN thin film (A-1) of the invention does not have a porous composite structure but forms an IPN structure.

(XPS Spectrum)

An XPS (X-ray photoelectron spectroscopy) spectrum of each of the IPN thin films (A-1) to (A-3) was measured. The obtained result is shown in FIG. 7 (only the IPN thin film (A-1)) and Table 2. Table 2 shows a composition of carbon, oxygen, nitrogen and zirconium components obtained from the result of XPS.

TABLE 2

| IPN composition | Carbon | Oxygen | Zirconium |
|---|---|---|---|
| (A-1) | 63.9 mol % | 32.4 mol % | 3.75 mol % |
| (A-2) | 58.1 mol % | 36.0 mol % | 5.94 mol % |
| (A-3) | 56.6 mol % | 35.9 mol % | 7.49 mol % |

It was confirmed from the proportion of nitrogen and silicon in each of the IPN thin films (A-1) to (A-3) that 90% or more of zirconium formed a zirconia structure. That is, it was confirmed that the IPN structure in each of the IPN thin films (A-1) to (A-3) was substantially complete.

That is, it became clear that in the IPN thin film of the invention, the organic polymer and the metal oxide were penetrated and bound with each other to form an IPN layer.

(Adjustment of the State in Aqueous Solution of IPN Thin Film (A-1))

The IPN thin film (A-1) laid in a state that various works could be easily achieved in ethanol. On the other hand, the IPN thin film (A-1) was hydrophobic and was condensed in water so that various works were not easy. Then, the adjustment was performed such that it could be worked in water. The IPN thin film in ethanol was sucked up by a micro pipette having a diameter of 2 mm and transferred into a sodium dodecylsulfate (SDS) (manufactured by Sigma) (5 mg/mL).

Furthermore, due to the matter that SDS was adsorbed onto the surface of the IPN thin film, the IPN thin film finely spread in the aqueous solution. As a result, it became possible to achieve a work in an aqueous solution.

The same procedures were followed, except for replacing SDS with cetyltrimethylammonium bromide (manufactured by Acros Organics) which is a cationic surfactant or diisooctyl sodium sulfosuccinate (manufactured by Wako Pure Chemical Industries, Ltd.) which is an anionic surfactant. As a result, the same result was obtained.

(State after Drying)

The IPN thin film (A-1) in ethanol was installed in a glass tube having an inner diameter of a tip portion thereof of 6 mm and dried in air. A crack or the like was not observed as to the IPN thin film (A-1) after this work.

Also, as to a thin film prepared in Example 1 of PCT International Publication Pamphlet No. WO 03/095193, the same procedures were followed. As a result, when it was intended to install the thin film in the pipette, it was readily broken so that an experiment was no longer possible.

(Evaluation of Strength)

Also, the IPN thin film (A-1) was stuck in a tip portion of a pipette having an inner diameter of 6 mm, and ethanol was slowly added from an upper portion of the pipette. Though ethanol ran down an inner wall of the tube and moved downward, the ethanol was not released immediately from the tip of the pipette. It was confirmed that the ethanol portion was supported to a height of 4 cm, namely 31 mg/mm$^2$. This demonstrates that a weight of 70,000 times of the weight of the IPN thin film (A-1) per unit area is supported. Also, as to the IPN thin film (A-1) after elapsing a half year, the same procedures were followed. As a result, it was confirmed that the same weight was supported.

Also, as to a PVA thin film having a thickness of 5 nm and a thin film prepared in Example 1 of PCT International Publication Pamphlet No. WO 03/095193, the same procedures were followed. As a result, when it was intended to install the thin films in the pipette, they were readily broken so that an experiment was no longer possible.

(Confirmation of Self-Supporting Properties and Durability)

The IPN thin film (A-1) floating methanol was sucked up by a micro pipette having a diameter of a tip portion thereof of 250 μm and then released.

As a result, damages were not observed at all, and the thin film was returned to the original state and spread. From this matter, it was perceived that the present thin film had extremely high self-supporting properties.

After drying, even when several months elapsed, such properties were not changed. That is, it was perceived that the IPN thin film (A-1) had high durability.

Also, as to a thin film prepared in Example 1 of PCT International Publication Pamphlet No. WO 03/095193, the same procedures were followed. As a result, when it was intended to install the thin film in the pipette, it was readily broken so that an experiment was no longer possible.

(Evaluation of Flexibility)

The IPN thin film (A-1) in ethanol was cut into a surface area of 10 cm$^2$, and the resulting IPN thin film (A-1) was sucked up together with ethanol by a micro pipette (aperture of tip: 160 μm). The area of the sucking portion of the micro pipette is not more than 1/30,000 times of that of the sucked IPN thin film. An optical microscopic photograph of that state was shown in FIG. 8. A behavior in which the IPN thin film laid several layers deep on top another and shrunk and was sucked up was confirmed. After sucking up in this manner, the IPN thin film (A-1) was returned into ethanol. As a result of observation of the IPN thin film (A-1) in this state, damages such as a crack were not observed in the IPN thin film (A-1).

Also, as to a thin film prepared in Example 1 of PCT International Publication Pamphlet No. WO 03/095193, the same procedures were followed. As a result, when it was intended to install the thin film in the pipette, it was readily broken so that an experiment was no longer possible.

From the foregoing results, it was confirmed that the IPN thin film of the invention had extremely high flexibility.

Example 2

The same procedures as in Example 1 were followed, except for performing the Step (2) and Step (3) in an air atmosphere. As a result, it was confirmed that by performing the Step (3) in a nitrogen atmosphere, the polymerization more smoothly proceeded.

Example 3

IPN thin films (B), (C) and (D) were manufactured in the same manner as in Example 1, except for changing the composition for IPN shown in Table 3 to prepare compositions for IPN (B), (C) and (D).

TABLE 3

| Composition for IPN | $Si(NCO)_4$ | HOBuA | HDODA | Polymerization initiator |
|---|---|---|---|---|
| (B) | 50.8 mol % | 46.8 mol % | 1.20 mol % | 1.19 mol % |
|  | 50.0 vol % | 46.9 vol % | 1.94 vol % | 1.19 vol % |
| (C) | 67.4 mol % | 31.0 mol % | 0.79 mol % | 0.79 mol % |
|  | 66.7 vol % | 31.2 vol % | 1.29 vol % | 0.79 vol % |
| (D) | 75.6 mol % | 23.2 mol % | 0.59 mol % | 0.59 mol % |
|  | 75.0 vol % | 23.4 vol % | 0.97 vol % | 0.59 vol % |

In Table 3, $Si(NCO)_4$, HOBuA and HDODA represent silicon tetraisocyanate, 4-hydroxybutyl acrylate and hexanediol diacrylate, respectively.

With respect to the obtained IPN thin films (B) to (D), an XPS spectrum was measured in the same manner as in Example 1. A composition of carbon, oxygen, nitrogen and silicon components obtained from the result is shown in Table 4.

TABLE 4

| IPN thin film | Carbon | Oxygen | Nitrogen | Silicon |
|---|---|---|---|---|
| (B) | 57.8 mol % | 32.9 mol % | 1.9 mol % | 7.32 mol % |
| (C) | 56.6 mol % | 31.7 mol % | 2.96 mol % | 8.72 vol % |
| (D) | 50.3 mol % | 36.6 mol % | 1.67 mol % | 11.5 vol % |

It was confirmed from the proportion of nitrogen and silicon in each of the IPN thin films (B) to (D) that 95% or more of silicon formed a silica structure. That is, it was confirmed that the IPN thin film structure in the present Example was substantially complete.

Also, the IPN thin film (B) and the IPN thin film (D) were subjected to SEM observation. The result is shown in FIG. 9 and FIG. 10, respectively. In all of the IPN thin films, damages such as a crack were not observed. Also, the evaluation of strength and the evaluation of flexibility were carried out in the same manners as in Example 1. As a result, it was confirmed that sufficient strength and flexibility were revealed.

Example 4

Surface Treatment of IPN Thin Film

A surface treatment of the IPN thin film was carried out according to FIG. 11.

(Step (A))

The IPN thin film (A-1) obtained in the foregoing Example 1 (being present in ethanol) was transferred into a liquid (liquid (A)) composed of any one of amphipathic substances shown in Table 5, glycerol and pure water using a micro pipette.

A solvent of the liquid (A) is constituted of water and glycerol (2/1) (weight ratio); and the amphipathic substance is added in an amount shown in Table 5.

(Step (B))

The IPN thin film (A-1) having been subjected to the treatment of Step (A) was transferred into a liquid (liquid (B)) composed of an amphipathic substance and water. In the liquid (B), the amount of the amphipathic substance is the same as in the liquid (A); and glycerol is not contained in the solvent.

(Step (C))

The IPN thin film (A-1) having been subjected to the treatment of Step (B) was transferred into pure water.

These results were shown in Table 5.

In Table 5, the "State in liquid (B)" is one obtained by visually observing the state after the treatment of Step (B); and the case where the IPN thin film (A-1) slowly spread without causing a damage was designated as "○".

In Table 5, the "State in pure water" is one obtained by allowing the IPN thin film (A-1) having been subjected to the treatment of Step (C) to stand in pure water for about 2 to 3 days and then visually observing the state; and the case where the IPN thin film (A-1) slowly spread without causing a damage was designated as "○".

After the treatment of Step (A), in all of the cases of using any of the amphipathic substances, the IPN thin film completely spread on the surface of the liquid (A) and dispersed several seconds thereafter.

As comparison, the IPN thin film (A-1) obtained in the foregoing Example 1 (existing in ethanol) was transferred into pure water using a micro pipette. The IPN thin film (A-1) first spread on the liquid surface, and thereafter, the surface was damaged, or the film tore.

TABLE 5

| Amphipathic substance | Addition concentration (mM) | State in liquid (B) | State in pure water |
|---|---|---|---|
| Brij 35 | 0.09 (=CMC) | ○ | ○ |
| PGME 10 | 1.0 | ○ | ○ |
| PGME 20 | 1.0 | ○ | ○ |
| PGME 50 | 1.0 | ○ | ○ |
| TWEEN 20 | 0.059 (=CMC) | ○ | ○ |
| $SC_{12}MAS$ | 1.0 | ○ | ○ |

The addition concentration of the amphipathic substance denotes a concentration relative to pure water; and the case where the concentration is equal to a micelle concentration was designated as "=CMC".

In Table 5, Brij 35 denotes polyoxyethylene glycol dodecyl ether (manufacture by Kanto Chemical Co., Inc.); PGME 10, PGME 20 and PGME 50 each denotes polyethylene glycol monooleyl ether (the final numeral represents a constitutional unit number) (manufacture by Kanto Chemical Co., Inc.); TWEEN 20 denotes polyoxyethylene sorbitan monolaurate (manufacture by Kanto Chemical Co., Inc.); and $SC_{12}MAS$ denotes sodium di-n-tetradecyl maleic acid sulfate, respectively. $SC_{12}MAS$ is obtained by a method described in Synthetic Bilayer Membranes with Anionic Head Groups, *Bull. Chem. Soc. Jpn.,* 51, 6, 1877-1879.

INDUSTRIAL APPLICABILITY

Since the IPN thin film of the invention is excellent in strength and flexibility, it can be used as a thin film having electrical or electronic characteristic, magnetic characteristic, optical function characteristic, permeation/separation properties, etc. In particular, it can be favorably used as a lipid bilayer having a flowable layer on the surface thereof.

What is claimed is:

1. A method for manufacturing a thin film comprising an interpenetrating network thin film, with the interpenetrating network thin film comprising a metal oxide and an organic polymer, which comprises forming a thin film layer composed of a composition comprising a metal oxide precursor and an organic monomer on a base material composed of at least one layer, subjecting the metal oxide precursor to a sol-gel reaction to convert the metal oxide precursor into a metal oxide, and polymerizing the organic monomer during the progress of the sol-gel reaction to convert the thin film layer into an interpenetrating network thin film.

2. The method for manufacturing a thin film according to claim 1, wherein after a part of the sol-gel reaction has proceeded, the polymerization of the organic monomer is started.

3. The method for manufacturing a thin film according to claim 1, wherein the base material comprises a support, the support comprising from $5.0 \times 10^{13}$ to $5.0 \times 10^{14}$ equivalents/$cm^2$ of a hydroxyl group or a carboxyl group on a surface thereof, and the thin film is formed on the surface of the support.

4. The method for manufacturing a thin film according to claim 1, wherein the base material comprises a support, the support comprising from $1.0 \times 10^{14}$ to $2.0 \times 10^{14}$ equivalents/$cm^2$ of a hydroxyl group or a carboxyl group on a surface thereof, and the thin film is formed on the surface of the support.

* * * * *